United States Patent
Kosa et al.

(10) Patent No.: US 7,936,496 B2
(45) Date of Patent: May 3, 2011

(54) INTERCONNECTION TAB USED WITH OPTICAL DEVICES

(75) Inventors: Tamas Kosa, Hudson, OH (US); Roy Miller, Stow, OH (US); Christine Martincic, Brunswick, OH (US); Eui-Yeul Park, Hudson, OH (US); Bahman Taheri, Shaker Heights, OH (US)

(73) Assignee: Alphamicron Incorporated, Kent, OH (US)

( * ) Notice: Subject to any disclaimer, the term of this patent is extended or adjusted under 35 U.S.C. 154(b) by 23 days.

(21) Appl. No.: 12/438,849

(22) PCT Filed: Sep. 10, 2007

(86) PCT No.: PCT/US2007/019633
§ 371 (c)(1),
(2), (4) Date: Feb. 25, 2009

(87) PCT Pub. No.: WO2008/033292
PCT Pub. Date: Mar. 20, 2008

(65) Prior Publication Data
US 2009/0201461 A1    Aug. 13, 2009

Related U.S. Application Data

(60) Provisional application No. 60/843,599, filed on Sep. 11, 2006, provisional application No. 60/919,416, filed on Mar. 22, 2007.

(51) Int. Cl.
*G02F 1/03* (2006.01)

(52) U.S. Cl. .......... 359/245; 351/159; 359/254
(58) Field of Classification Search ........... 351/159; 359/245
See application file for complete search history.

(56) References Cited

U.S. PATENT DOCUMENTS

| | | | |
|---|---|---|---|
| 4,386,293 A | 5/1983 | Waldron | 313/583 |
| 5,067,796 A | 11/1991 | Suzuki et al. | 359/88 |
| 5,416,622 A | 5/1995 | Engfer et al. | 359/88 |
| 6,213,602 B1 | 4/2001 | Smarto | 351/159 |
| 6,847,428 B1 * | 1/2005 | Sekiguchi et al. | 349/139 |
| 7,425,066 B2 | 9/2008 | Blum et al. | 351/159 |
| 7,576,362 B2 * | 8/2009 | Takayama et al. | 257/79 |

FOREIGN PATENT DOCUMENTS

| | | |
|---|---|---|
| JP | 59 094780 | 5/1984 |
| WO | WO 94/00789 | 1/1994 |
| WO | WO 00/77559 A1 | 12/2000 |

* cited by examiner

*Primary Examiner* — Jessica T Stultz
(74) *Attorney, Agent, or Firm* — Renner Kenner Greive Bobak Taylor & Weber

(57) ABSTRACT

An optical device with at least one interconnection tab is provided. The optical device includes a pair of opposed substrates with a gap therebetween filled with an electro-optic material. Each substrate has a facing surface with a substrate electrode disposed thereon. A sealing material is disposed between the pair of opposed substrates to contain the electro-optic material. At least one interconnection tab is interposed between the substrates. The interconnection tab includes an insulator layer with opposed surfaces. A tab electrode layer is provided on each surface, wherein each tab electrode layer contacts a corresponding substrate electrode. And each tab electrode layer includes a portion that extends from the pair of opposed substrates on selected portions of the insulator layer.

11 Claims, 5 Drawing Sheets

INTERCONNECTION TAB USED WITH OPTICAL DEVICES

CROSS-REFERENCE TO RELATED APPLICATIONS

This application claims priority of U.S. Provisional Application Ser. Nos. 60/843,599 filed Sep. 11, 2006 and 60/919,416 filed Mar. 22, 2007, both of which are incorporated herein by reference.

TECHNICAL FIELD

The present invention is generally directed to eyewear. In particular, the present invention is directed to eyewear with lenses using electronically controllable variable optical properties such as those available with liquid crystal materials. Specifically, the present invention is directed to such lenses having a flexible interconnection tab.

BACKGROUND ART

Eyewear is believed to have been developed in Europe and China during the thirteenth century. It is also believed that primitive man used shields made from bone and/or wood to protect their eyes from sun and wind. Primarily, eyewear was developed for functional reasons, namely to improve the wearer's vision and to protect their eyes from environmental elements. As time passed, eyewear as a fashion accessory became common.

Eyewear has many basic components and generally accepted terminology. Frames, primarily made of plastic, metal, or the like, are provided for holding lenses positionable in close proximity to the eyes of the wearer. A bridge, which is typically integral with the frame, typically rests on the wearer's nose and provides a natural resting spot for the frame. A hinge may be mounted to the frames at each side and temples, which are proximal the wearer's head, extend from the other side of each hinge. Earpieces may extend downwardly from the temples near the wearer's ears to further secure the eyewear.

The frame, which holds the lenses that correct or otherwise alter the wearer's vision, includes a frame front. The two temples may be replaced with a single strap that goes around the head such as used in goggles. New advances in materials, memory metals in particular, permit the replacement of a traditional hinge with a continuous structure and suggest that the term "joint" may be used instead of hinge. Indeed, the term "joint" may also be more appropriate for eyeglasses employing a strap instead of temples. The frames provide a frame cavity, which may also be referred to as an aperture, to carry a lens. The left lens is typically referred to as ocular sinister (OS) and the right lens is typically referred to as ocular dexter (OD).

Frames generally fall into one of three categories: rimmed, semi-rimless, and rimless. In a rimmed configuration, the lens aperture is completely encircled by the frame. In a semi-rimless configuration, a partial frame carries the lens, although the frame may include a filament which functions to hold the lens in place without providing the appearance of a rim. And in a rimless configuration, the lenses are directly carried by the temples and/or bridge so that no frame encircles the lens or lenses.

The hinges between the temples and the frames may be provided in a number of different constructions. The standard friction hinge is a discrete hinge that attaches the temples and frame front to one another. A spring hinge may also be provided wherein a spring is utilized to bias the connection between the temples and frame front so as to provide a more secure or snug fit on the head of the person wearing the eyewear. An integrated hinge utilizes fingers, or leafs, which are an extension of the respective temples and frame front and wherein a hinge pin is added to connect the fingers and leafs to one another. As mentioned previously, a continuous hinge may be provided wherein the frame front and temples are continuous or integral with one another.

Prior art eyewear utilizes frame rims which are elastically distorted to permit a rigid lens, provided with or without a beveled edge, to be inserted into the frame aperture. Plastic frames are often heated to increase the elasticity of a material so as to allow for the distortion which is relatively small. Metal frames may also be used and often have mechanical joints that are opened to accommodate the rigid lens. It will be appreciated that large deformations are possible with metal frames so as to allow for insertion of appropriate sized lenses.

Electro-optical materials, which change their optical appearance upon application of an electrical field, have been developed for use with eyewear. Liquid crystal materials are commonly used but other electro-optic materials show promise. These materials can be used in eyewear such as goggles and visors, it will be appreciated that a number of problems are realized in attempting to incorporate a liquid crystal device into a prior art eyewear frame. Indeed, given the basic form and construction of a liquid crystal device or any device which uses an electro-optic material that can be used in a lens, special features must be incorporated into an eyeglass frame to accommodate such a lens. As will be understood by a skilled artisan, liquid crystal and other electro-optic lenses have an edge seal wherein a glue or adhesive bead with different electro-optical properties than the active area—the area containing the electro-optic material—is provided. It will be appreciated that it is desirable to hide the edge seal within the eyewear frame. Moreover, these types of lenses require protruding tabs to serve as electrodes for allowing application of a desired electrical waveform or voltage to the electro-optic material. Accordingly, the device, the edge seal, and/or the electrode tabs are typically not robust enough to survive insertion into an elastically deformed frame. This is especially true in sunglasses which do not employ a carrier lens. In other words, in generally ophthalmic eyewear applications, a corrective lens is provided which provides a substantial carrier or base to which the liquid crystal device may be attached. As such, the rigidity of the carrier is able to withstand the forces required to insert the lens into the eyewear. However, a liquid crystal lens or similar lens, by itself, cannot withstand such forces. It will further be appreciated that the electro-optic lenses require batteries, drive circuits, switches and other interconnecting conductors for operation. These components must be located somewhere in or on the frame while maintaining an aesthetically pleasing appearance or indeed, be totally unobservable by the wearer or the casual observer.

One aspect of liquid crystal lenses that have proven to be problematic is the interface of the liquid crystal (LC) lens electrodes which are used to apply an electric field to the liquid crystal material. Past LC lenses required each electrode to be patterned with a special tab to which some type of conductor, e.g. wire or tape, was used for interconnection to a control circuit. Although such an approach was workable, it has been found to be difficult to implement for manufacturing a large number of lenses. And such an interconnection was found to be somewhat unreliable and susceptible to breakage. Moreover, the need to form a tab hinders the ability to extend the electro-optically active material to peripheral edges of the lens. Additionally, some lens designs have used small amounts of conductive materials (adhesives) as so-called "crossover dots" to electrically connect the electrode of one substrate to a separate conductive tab on the opposing substrate. As such, crossover dots further complicate lens design and provide another point for device failure. A further drawback of lens designs employing crossover dots is that if the lens is found to be defective, the lens cannot be easily repaired.

Based upon the foregoing problems, it will be appreciated that there is a need for an improved interconnection of electro-optic lenses. Indeed, there is a need for lens interconnections that do not require special patterning of the electrode layers on the lenses. And there is a need for an interconnection that is flexible and robust.

BRIEF DESCRIPTION OF THE DRAWINGS

For a complete understanding of the objects, techniques and structure of the invention, reference should be made to the following detailed description and accompanying drawings wherein.

SUMMARY OF THE INVENTION

In light of the foregoing, it is a first aspect of the present invention to provide an interconnection tab used with optical devices.

It is another aspect of the present invention to provide an optical device having at least one interconnection tab comprising a pair of opposed substrates having a gap therebetween filled with an electro-optic material, each substrate having a facing surface with a substrate electrode disposed thereon, a sealing material disposed between the pair of opposed substrates to contain the electro-optic material, and at least one interconnection tab interposed between the substrates, the tab comprising an insulator layer having opposed surfaces, a tab electrode layer on each surface, each tab electrode layer contacting a corresponding substrate electrode, wherein each tab electrode layer includes a portion that extends from the pair of opposed substrates on selected portions of the insulator layer.

BEST MODE FOR CARRYING OUT THE INVENTION

Figure 1:
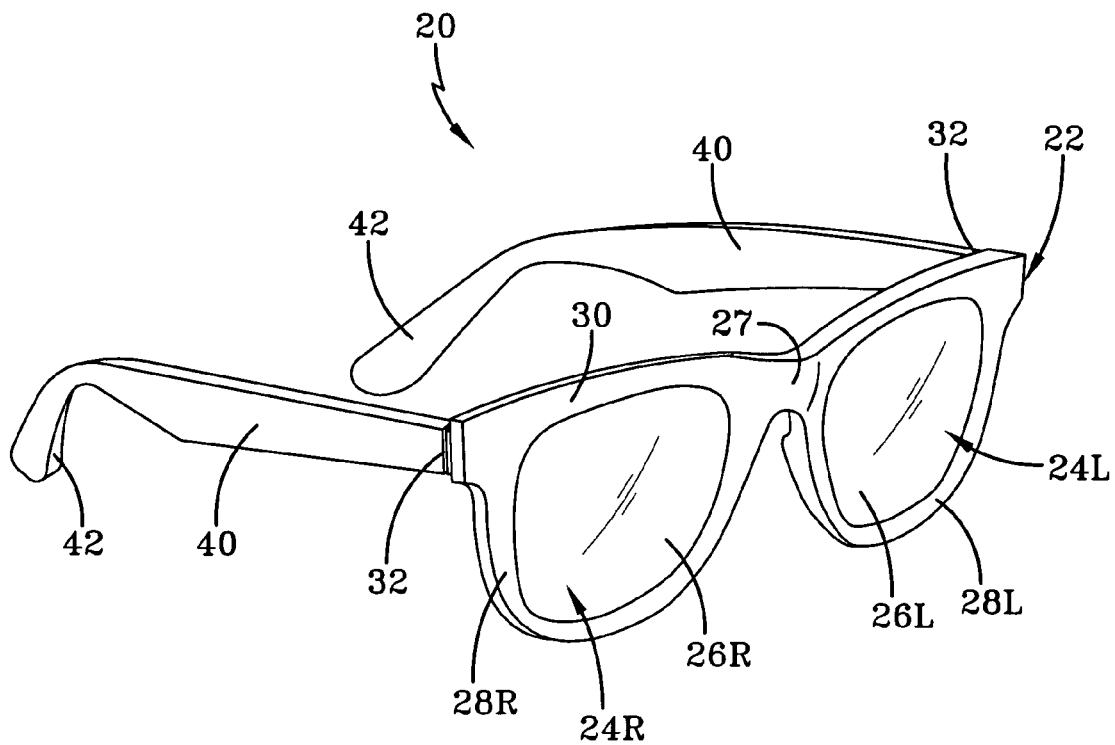
FIG. 1 is a perspective view of a prior art eyewear assembly.

Referring now to the drawings, and in particular to FIG. 1, it can be seen that a prior art eyewear assembly is designated generally by the numeral 20. It will further be appreciated that the eyewear assembly may also be referred to as glasses, spectacles, or the like. The eyewear assembly includes a frame 22 which provides at least one aperture 24 which carries a lens 26 which may also be referred to as an optical device. In most eyewear, it will be appreciated that two apertures are provided wherein each aperture is associated with the wearer's eye. Accordingly, the apertures, lenses and other related components associated with the wearer's left eye are provided with a capital letter L suffix and the aperture, lens and other components associated with the wearer's right eye are provided with a capital letter R suffix. The frame 22 may include a bridge 27 which separates a rim 28L from a rim 28R. And the frame may be provided in either a rimmed, semi-rimless or rimless configuration. The frame 22 provides a frame front 30 upon which may be mounted a hinge 32. Although not shown in detail, it will be appreciated that the hinge 32 may provide a frame finger that is secured to the frame front wherein a temple finger, which is secured to a temple 40, mates with the frame finger and is interconnected thereto by a pin. Although not shown, the hinge may be provided in a spring-biased or other configuration. As noted, the temple 40 extends from the temple finger or from the frame front and is aligned to be adjacent the head of the wearer in such a manner that the eyewear is easily carried by the user's head. If desired, an earpiece 42 may extend from each temple 40 so as to facilitate retention of the eyewear assembly upon the wearer's head. In typical eyeglass or eyewear configurations, a lens is carried within the aperture 24 to provide vision correction in any number of configurations. In other words, the lenses may be configured to improve near-sightedness, far-sightedness and other eye-related impairments. And lenses may be shaded or tinted to provide protection from sun glare, ultraviolet light and the like. It will also be appreciated that tinted eyewear may be utilized as a fashion accessory to match physical attributes or clothing of the person wearing the eyewear.

Figure 2:
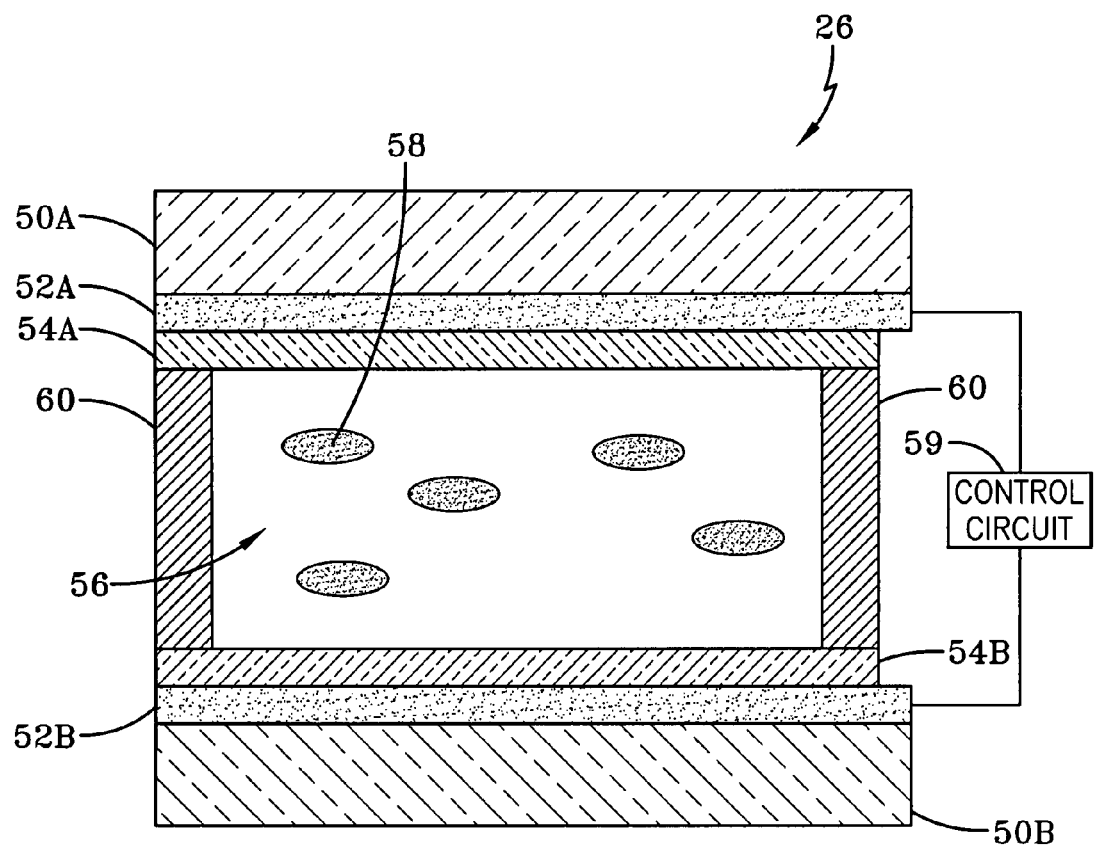
FIG. 2 is an elevational, cross-sectional schematic of an electro-optic device, such as a liquid crystal lens, used in eyewear according to the present invention.

Referring now to FIG. 2, it will be appreciated that one type of lens may be a liquid crystal lens construction. Although a liquid crystal lens construction is described below, it will be appreciated that any electro-optic material, such as electrochromic dyes, electro-phoretic materials, or like materials could be used in place of the liquid crystal material. Such liquid crystal lens constructions are disclosed in U.S. Pat. Nos. 6,239,778; 6,690,495; 7,102,602; all of which are incorporated herein by reference. Briefly, a standard liquid crystal lens construction is designated generally by the numeral 26. Such a lens may comprise spaced apart, opposed substrates 50A and 50B, wherein each substrate provides corresponding transparent electrode layers 52A and 52B, which are typically formed from indium tin oxide or other appropriate conductive material. As will be discussed, electrode layers allow for application of a voltage across the gap between the substrates. The substrates may be flat, curved, or doubly curved. The substrates may also be rigid or flexible. If required, an alignment layer 54 may be disposed on each electrode layer or just one of the electrode layers. The alignment layers preferentially align the liquid crystal molecules adjacent to the alignment layers, wherein the molecules are part of the liquid crystal material received between the substrates. A gap is typically provided between the substrates and may be maintained by spacers, as is commonly known in the art. Accordingly, the opposed substrates 50 form a gap 56 which receives a liquid crystal or other electro-optically active material 58. Each electrode layer 52 is connected to a control circuit 59 which may include a switch, a power supply, a drive circuit and other circuit components. The control circuit applies a voltage and/or voltage waveform in an appropriate manner to change the orientation of the electro-optic material. As such, by changing the orientation of the material, various optical properties—absorption, no absorption, high transmission, low transmission, and the like—may be obtained.

An edge seal 60 is provided around or about the outer periphery of the lens 26 so as to retain the electro-optic material between the substrates. It will be appreciated that the edge seal and associated area is not an optically active area. Accordingly, it is desirable to keep the edge seal periphery area hidden or otherwise concealed within the frame of the eyewear.

Interconnection Tab

Referring now to FIGS. 3-8, it can be seen that an interconnection tab is designated generally by the numeral 500. It will be appreciated that the various components of the tab 500 shown in the drawings are somewhat enlarged so as to facilitate recognition of the tab's structural features. The tab 500 is utilized to connect electrodes of a liquid crystal or other electro-optically active lens to a control circuit or electrical energy power source to control operation of the lens. As will become apparent as the description proceeds, the tab 500 eliminates the need to provide patterned electrodes on the lens substrates or to provide a special configuration of the substrates. The tab 500 simplifies the connection of the lens to a control circuit or other power source by reducing time-consuming assembly steps. It is also believed that use of the tab 500 provides a more reliable connection between the lens and the control circuit.

Figure 3:
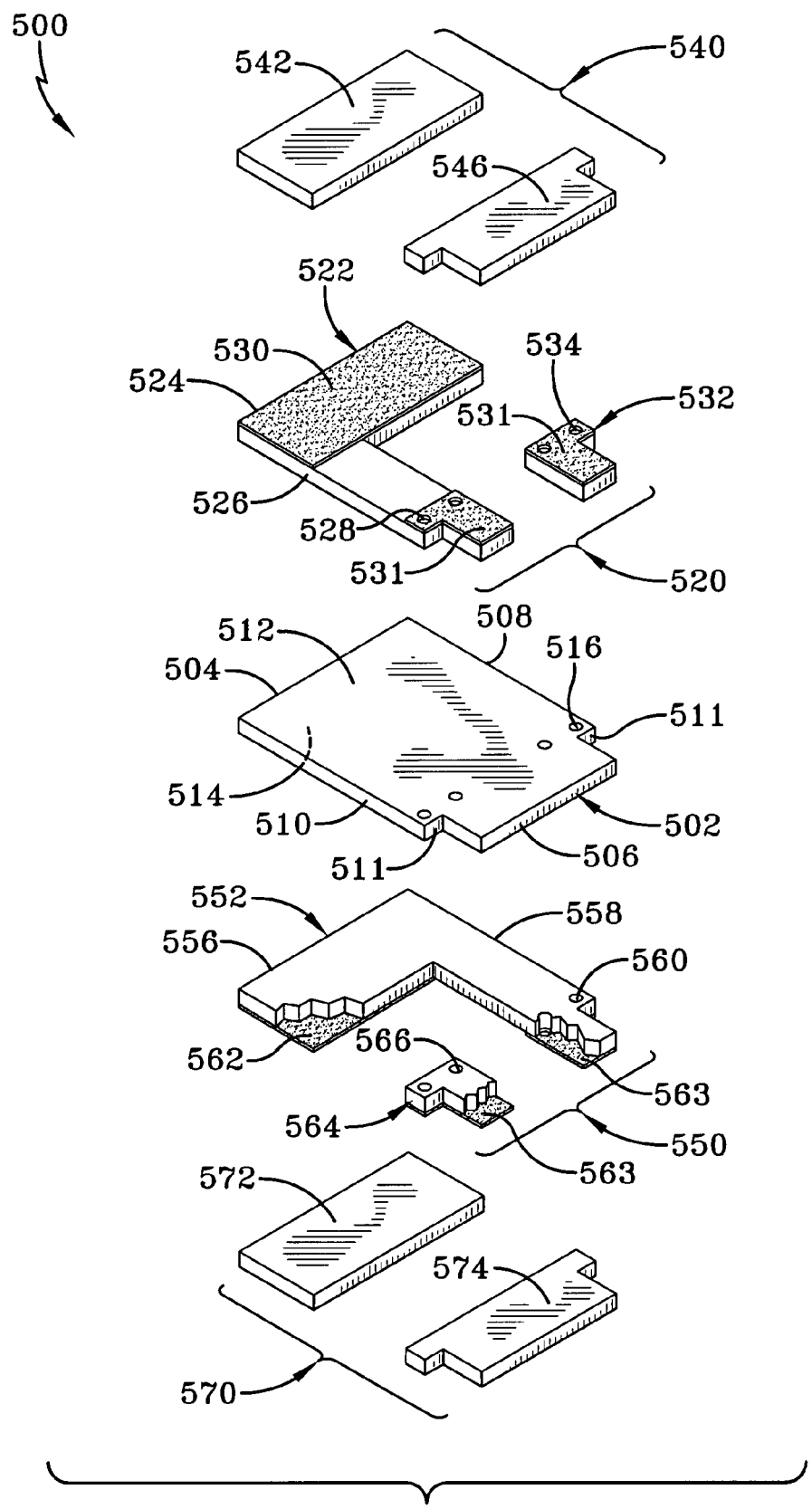
FIG. 3 is an exploded top perspective assembly view of an interconnection tab made in accordance with the concepts of the present invention, wherein some of the components are broken away.
Figure 4:
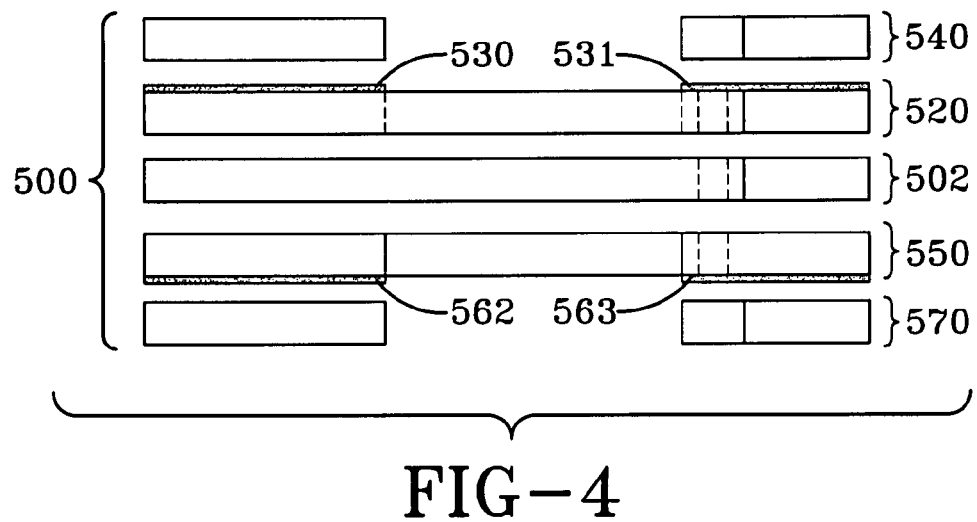
FIG. 4 is a side elevational assembly view of the interconnection tab shown in FIG. 3.

As best seen in FIGS. 3 and 4, the interconnection tab 500 is a multi-layer construction that when assembled facilitates connection to electrodes provided by the lens. The tab 500 includes an insulator 502 which is made of a flexible non-conductive plastic material. Although the thickness of the insulator layer is dependent upon the size of the lens it will be connected to, in the present embodiment the insulator layer has a thickness of about 25μ. The insulator 502 is provided in a substantially square or rectangular configuration, although it will be appreciated that other shapes could be utilized. In any event, the insulator 502 provides a lens edge 504 which is positionable between the electrodes of the lens 26, and a terminal edge 506 at an opposite end of the insulator 502 which is connectable to a control circuit or other power source. Connecting the edges 504 and 506 to one another are side edges 508 and 510. The side edges 508, 510 may be provided with terminal notches 511 proximal to the terminal edge 506. The notches 511 are utilized to easily identify and orient the interconnect tab to the lens as will become apparent as the description proceeds. The insulator 502 provides a top surface 512 opposite a bottom surface 514. It will be appreciated that the terms top and bottom are used only as a reference in describing the insulator layer inasmuch as the tab could be re-oriented as long as the lens edge 504 is what is received between the substrates of the lens 26.

The insulator 502 has a plurality of holes 516 which extend therethrough. As will become apparent, the holes are associated with specific electrodes and at least two holes are required, wherein at least one of the holes is associated with a corresponding electrode. It will also be appreciated that the holes are positioned proximal to the terminal edge 506.

An electrode layer 520 is disposed on the surface 512 of the insulator 502. The electrode layer 520 includes an L-shaped electrode 522 which is made of a conductive material such as copper or an alloy that is conducive for connection to a conductive electrode provided by the lens and is suitable for electrical connection to the drive circuit components. It will also be appreciated that the material used for all electrodes disposed on the insulator layer 502 can withstand flexure without separating therefrom. The electrode 522 is affixed, plated, or otherwise secured to the top surface 512. The electrode 522 includes a first leg 524 which extends primarily along the lens edge 504 but does not extend past or over the insulator 502. As used herein for all electrodes of the interconnection tab, any portion of an electrode disposed along any edge of the insulator should be taken to mean that the electrode portion is positioned substantially adjacent the recited edge on the designated surface. The electrode 522 also includes a second leg 526 which is substantially perpendicular to the first leg 524 and extends along the side edge 510 and terminates proximal to the terminal edge 506. Like the first leg 524, the second leg 526 does not extend past or over the insulator 502. The second leg 526 has a pair of holes 528 extending therethrough, although only one is required. The holes 528 are aligned with the corresponding holes 516 upon the insulator 502. A conductive adhesive 530 is disposed on the first leg 524 along the length of the lens edge 504. A non-conductive adhesive 531 is disposed on the second leg 526 proximal to the terminal edge 506.

The electrode layer 520 also includes a pad electrode 532 which is spaced apart from and does not contact the L-shaped electrode 522. The pad electrode 532 is affixed to the top surface 512 in much the same manner as the electrode 522 and positioned along a portion of the terminal edge 506 and the side edge 508 and is aligned with the terminal notch 511. The pad electrode 532 does not extend beyond the edge of the insulator 502 and is also provided with a non-conductive adhesive 531 on a side opposite the insulator. The pad electrode 532 provides a pair of holes 534, although only one is required, which are aligned with the corresponding holes 516 of the insulator.

A cover layer, designated generally by the numeral 540, is positioned over the electrode layer 520. The cover layer 540 includes a lens edge release liner 542 which covers the first leg 524 that is positioned along the lens edge 504. The cover layer 540 also includes a terminal edge release liner 546 which covers an end portion of the second leg 526 and the pad electrode 532 along the terminal edge 506. The cover layer 540 is utilized to prevent contaminants from attaching to the adhesive provided on the electrode layer 520 prior to assembly to the lens. At the appropriate time, the liners are removed so as to allow attachment to the electrodes 522 and 532.

An electrode layer 550 is positioned and secured to the surface 514 of the insulator 502. The electrode layer 550 is configured in much the same manner as the electrode layer 520. Specifically, the electrode layer 550 includes an L-shaped electrode 552 which has a first leg 556 disposed along the length of the lens edge 504. The electrode 552 also provides a second leg 558 which extends substantially perpendicularly from the first leg 556 and is positioned along the side edge 508 and extends all the way to the terminal edge 506. The second leg 558 is also notched at the junction of the terminal edge 506 and the side edge 508. The second leg 558 has at least two holes 560, although only one is required, wherein the holes 560 are aligned with the holes 516 insulator and the holes 534 provided by the pad electrode 532. As with the other electrodes, the L-shaped electrode 552 does not extend beyond the edges of the insulator 502. A conductive adhesive 562 is disposed along the first leg 556 on a side opposite the insulator 502. An optional conductive adhesive 563 is disposed on the pad electrode 564 and a portion of the leg 558 proximal to the terminal edge 506.

The electrode layer 550 also includes a pad electrode 564 which is spaced apart from the electrode 552 along the terminal edge 506 and a portion of the side edge 510. The pad electrode 564 has at least two holes 566, although only one is required, which are aligned with the corresponding holes 516 of the insulator 502 and the holes 528 of the electrode 522.

A cover layer 570 selectively covers the layer 550 in much the same manner as the cover layer 540 covers the electrode layer 520. Specifically, the cover layer 570 includes a lens edge release liner 572 which covers the first leg 556. If the conductive adhesive 563 is used, the release liner 574 covers the pad electrode 564 and a portion of the second leg 558 that is aligned along the terminal edge 506 and the side edge 508. If the conductive adhesive 563 is not used, release liner 574 is absent. The cover layer 570 is utilized to prevent contaminants from attaching to the adhesive provided on the electrode layer 550 prior to assembly to the lens and the driving or power supplying components. At the appropriate time the liners are removed so as to allow attachment to the electrodes 552 and 564.

Figure 6:
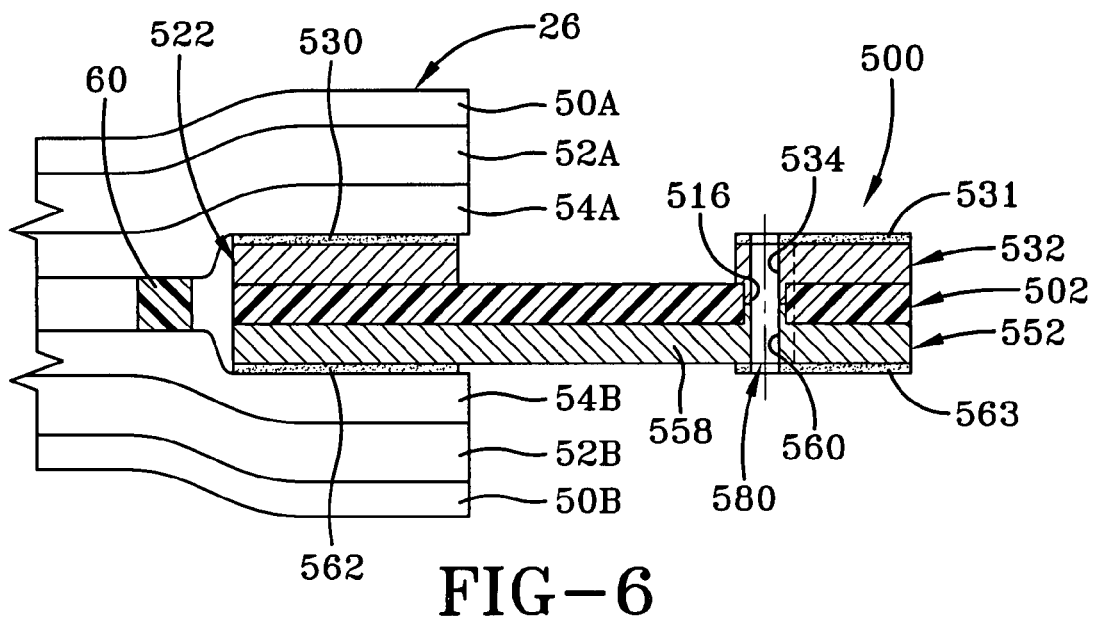
FIG. 6 is a partial cross-sectional view of the tab and the lens taken along lines 6-6 of FIG. 5.
Figure 7:
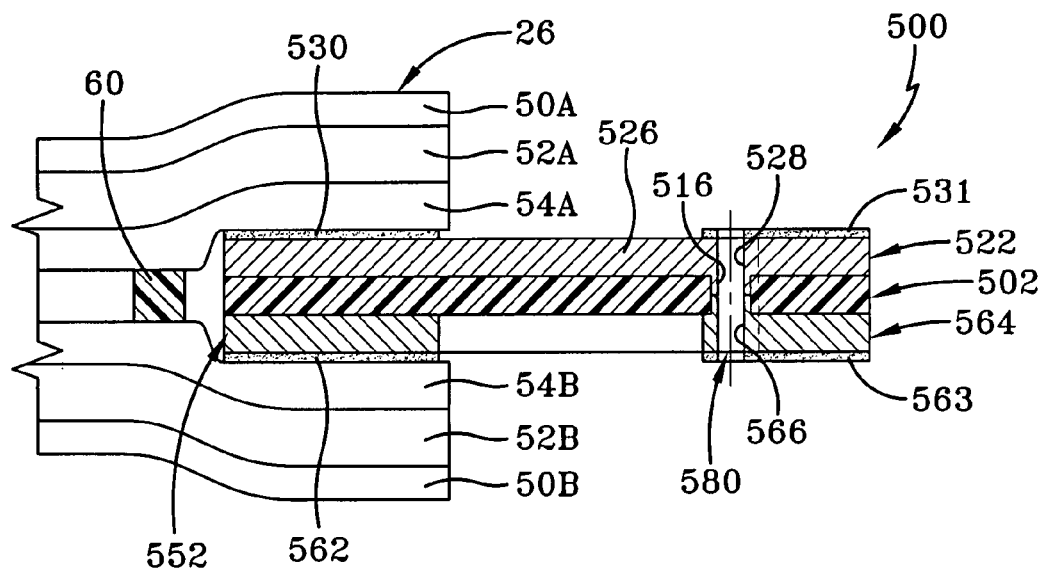
FIG. 7 is a partial cross-sectional view of the tab and the lens taken along lines 7-7 of FIG. 5.

As best seen in FIGS. 6 and 7, all of the holes that are aligned with one another are configured in such a manner so as to form a via 580 for electrical conductivity to occur between a pad electrode on one side of the insulator layer and the L-shaped electrode on the other side of the insulator layer. In other words, the insulator 502 is constructed in such a manner that when the electrode layers are disposed thereon, the interior surface of the holes 516 are coated with the conductive material used for the electrodes such that an electrical connection is made between the pad electrode on one side of the insulator layer with the L-shaped electrode on the other side of the insulator layer.

Figure 5:
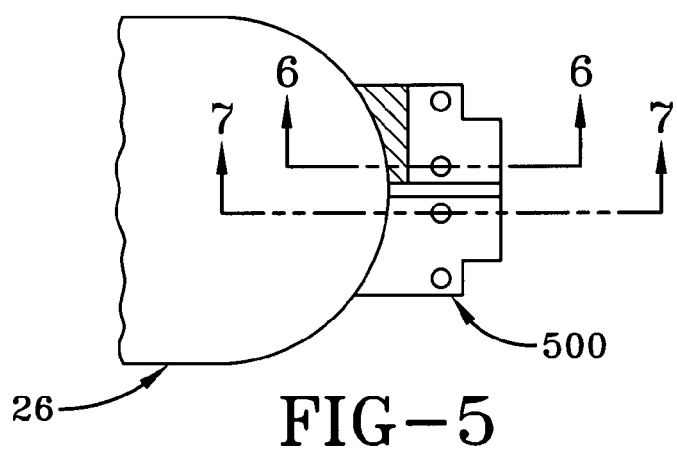
FIG. 5 is a partial top view of the interconnection tab connected to an electro-optic lens according to the present invention.

Referring now to FIG. 5, it can be seen that the interconnection tab 500 is secured to the lens 26. This interconnection is best seen in FIGS. 6 and 7. During assembly of the lens 26, an edge seal 60 surrounds the outer periphery of the opposed substrates so as to retain the liquid crystal or other optically active material within the spaced apart gap of the substrates 50A and 50B. As noted previously, the substrates 50 are provided with an electrode layer 52 which may or may not be covered by a polyimide layer 54 or other related material needed to facilitate the operation of the lens 26. After or during assembly of the substrates 50A and 50B to one another, the interconnection tab 500 is positioned therebetween. If the tab 500 is inserted after assembly of the lens 26, the substrates, which in this embodiment are flexible, are slightly separated at a selected area and the tab is inserted. Then the substrates are pressed or laminated back together, with or without heat, to re-attach the substrates to one another. And, it will be appreciated that the positioning of the tab may occur prior to, or after, the filling of the lens with liquid crystal or other material. In the alternative, if the substrates 50A and 50B are rigid, the substrates could be slightly notched so as to accommodate the thickness of the tab 500. Any openings between the inserted tab and the substrates are filled by the edge seal 60.

Immediately prior to the insertion of the tab 500, the liners 542 and 572 are removed so as to expose the conductive adhesive provided on the respective first leg portions 524 and 556. In order to ensure a proper connection between the interconnection tab and the electrodes provided by the lens, the edges of the substrates 50A and 50B completely cover and extend at least a small portion past the width of the first legs 524 and 556. Application of pressure to the substrates 50A and 50B creates an electrical connection between the respective electrodes 52A and 52B and the first legs 524 and 556. Use of appropriate conductive adhesive material ensures that the electrode layers make electrical contact with the facing electrode layers of the lens. The alignment layers 54A and 54B are constructed of such a material so as to not interfere with the electrical connection between the substrate's electrodes and the electrode layers of the interconnection tab.

Referring now to the details of FIGS. 5 and 6, which are not drawn to scale, it can be seen that the bottom electrode 52B is connected to the L-shaped electrode 552 and also to the pad electrode 532 through the via 580. Accordingly, the electrical connection to the bottom substrate electrode is made by electrically and mechanically connecting an appropriate attachment to the pad electrode 532 and/or the second leg 558.

And as seen in FIG. 7, a similar type of connection is made to the top electrode substrate 52A by the L-shaped electrode 522 and the pad electrode 564. Accordingly, an appropriate connection can be made to the top substrate by applying an electrical connection to the pad electrode 564 and/or the second leg 526.

Skilled artisans will appreciate that the L-shaped electrodes 522 and 552 could be any shape, such as rectangular. Use of an L-shape for the electrodes 522 and 552 provides maximum contact with the adjacent substrate electrodes while providing an extending portion of sufficient size to allow interconnection to the control circuit while ensuring that the size of the tab does not interfere with expected mechanical operation of the eyewear's frame and hinges. Any shape of the electrodes that meet these features can be incorporated into the tab 500.

Figure 8:
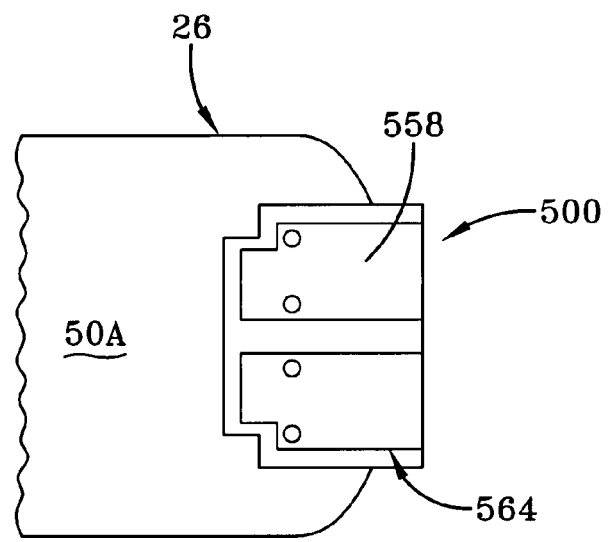
FIG. 8 is a partial top view of the lens connected to the interconnection tab, wherein the interconnection tab is folded over the lens.

Depending upon the use of the lens, eyewear frames, goggle frames, or other carrying device, the interconnection tab can be folded over in an appropriate direction so as to allow for spring-biased contacts to make contact with the electrode facing surface. As best seen in FIG. 8, the interconnection tab 500 is folded over the lens 26, and specifically the substrate 50a, so as to show a portion of the second leg 558 and the pad electrode 564, both of which may then be positioned to contact electrodes or wires for connection to a control circuit.

Use of the interconnection tab is advantageous for many reasons. Use of the tab simplifies electrical connections to the lens and saves on manufacturing steps in assembly of the lenses into goggles, visors, sunglasses, and other eyewear devices. Special modification and/or patterning of the lens electrodes is not required, saving on process steps and costs in manufacturing the lenses. Since the tab makes electrical contact with both substrates, it eliminates the need for crossover dots and the process steps to form them. The tab is flexible so as to allow for adaptation to different connection mechanisms coupled to the control circuit. It is believed that use of the tab provides for a more reliable connection. And it will be appreciated that the tab is scalable so that it can be used for different sizes of eyewear devices. Still another advantage of the present invention is that if the electric connection is found to be defective, the tab can be easily removed and replaced to allow re-working of the cell.

Thus, it can be seen that the objects of the invention have been satisfied by the structure and its method for use presented above. While in accordance with the Patent Statutes, only the best mode and preferred embodiment has been presented and described in detail. It is to be understood that the invention is not limited thereto and thereby. Accordingly, for an appreciation of the true scope and breadth of the invention, reference should be made to the following claims.

What is claimed is:

1. An optical device having at least one interconnection tab, comprising:

a pair of opposed substrates having a gap therebetween filled with an electro-optic material, each said substrate having a facing surface with a substrate electrode disposed thereon;

a sealing material disposed between said pair of opposed substrates to contain said electro-optic material; and at least one interconnection tab interposed between said substrates, said interconnection tab comprising:

an insulator layer having opposed surfaces, each insulator surface comprising a tab electrode in electrical connection with the substrate electrode facing said tab electrode, and a pad electrode in electrical connection with the substrate electrode facing the opposed surface of the insulator layer.

2. The optical device according to claim 1, wherein said insulator layer, each said tab electrode, and each said pad electrode has at least one conductive via extending therethrough so that each said pad electrode is in electrical connection to the tab electrode on the opposed surface of the insulator layer.

3. The optical device according to claim 1, further comprising:

a conductive adhesive disposed on at least a portion of each said tab electrode.

4. The optical device according to claim 1, wherein said insulator layer has a lens edge received between said pair of opposed substrates opposite a terminal edge extending from said substrates.

5. The optical device according to claim 1, wherein at least one said tab electrode is L-shaped.

6. The optical device according to claim 1, wherein each said pad electrode is spaced apart from said tab electrode on each said surface of the insulator layer.

7. The optical device according to claim 1, wherein said interconnection tab has a thickness that is greater than the gap between said pair of opposed substrates.

8. The optical device according to claim 1, wherein said interconnection tab is flexible.

9. The optical device according to claim 1, wherein said interconnection tab is removably insertable between said pair of opposed substrates.

10. An optical device, comprising:

a first and second flexible substrate having a gap therebetween filled with an electro-optic material and a sealing material disposed therebetween to contain said electro-optic material, said first substrate having a first substrate electrode and said second substrate having a second substrate electrode;

an interconnection tab interposed between said first and second substrates, said interconnection tab comprising:

an insulator layer having a top surface opposite a bottom surface;

wherein disposed on said top surface is a first tab electrode and a first pad electrode; and wherein disposed on said bottom surface is a second tab electrode and a second pad electrode;

wherein the first tab electrode and the second pad electrode are in electrical connection with the first substrate electrode, and wherein the second tab electrode and the first pad electrode are in electrical connection with the second substrate electrode.

11. The optical device of claim 10, wherein the first tab electrode and the first pad electrode on the top surface are spaced apart from each other, and wherein the second tab electrode and the second pad electrode on the bottom surface are spaced apart from each other.

* * * * *